(12) United States Patent
Dansereau et al.

(10) Patent No.: US 7,430,458 B2
(45) Date of Patent: *Sep. 30, 2008

(54) CALCULATING AN ET VALUE FOR AN IRRIGATION AREA

(75) Inventors: Dan A. Dansereau, Providence, UT (US); Peter Carlson, Petaluma, CA (US)

(73) Assignee: HydroPoint Data Systems, Inc., Petaluma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/799,588

(22) Filed: May 2, 2007

(65) Prior Publication Data

US 2008/0091307 A1    Apr. 17, 2008

Related U.S. Application Data

(63) Continuation-in-part of application No. 10/977,349, filed on Oct. 29, 2004, now Pat. No. 7,337,042, and a continuation-in-part of application No. 10/977,130, filed on Oct. 29, 2004, and a continuation-in-part of application No. 10/977,131, filed on Oct. 29, 2004.

(60) Provisional application No. 60/515,932, filed on Oct. 29, 2003, provisional application No. 60/515,628, filed on Oct. 29, 2003, provisional application No. 60/515,905, filed on Oct. 29, 2003.

(51) Int. Cl.
*G05D 7/00* (2006.01)
*G05D 11/00* (2006.01)
*A01G 25/00* (2006.01)
*A01G 27/00* (2006.01)

(52) U.S. Cl. .......................... 700/284; 239/63; 239/69; 73/170.16; 73/78.2

(58) Field of Classification Search ......... 700/281–284; 239/63–69; 137/78.2, 170.16
See application file for complete search history.

(56) References Cited

U.S. PATENT DOCUMENTS

| | | |
|---|---|---|
| 5,060,859 A | 10/1991 | Bancroft |
| 5,208,855 A | 5/1993 | Marian |
| 5,870,302 A | 2/1999 | Oliver |
| 6,108,590 A | 8/2000 | Hergert |
| 6,145,755 A | 11/2000 | Feltz |
| 2004/0015270 A1 | 1/2004 | Addink |
| 2004/0181315 A1 | 9/2004 | Cardinal et al. |
| 2006/0116792 A1 | 6/2006 | Addink |
| 2006/0161309 A1 | 7/2006 | Moore et al. |
| 2006/0184285 A1 | 8/2006 | Evelyn-Veere |
| 2007/0016334 A1 | 1/2007 | Smith et al. |

*Primary Examiner*—Ronald D Hartman, Jr.
(74) *Attorney, Agent, or Firm*—Brian R. Short (57) ABSTRACT

A method of method of calculating an ET value for an irrigation area is disclosed. The method includes a weather parameter measurement system collecting at least one weather parameter of a weather parameter area, the at least one weather parameter of the weather parameter area providing a representation of weather outside of the irrigation area. An irrigation area weather parameter is calculated providing a representation of the weather within the irrigation area from the at least one weather parameter of the weather parameter area. The ET value for the irrigation area is calculated from an N-dimensional continuous function using the at least one irrigation area weather parameter, wherein the N-dimensions includes at least a 3-dimensional spatial cube.

21 Claims, 6 Drawing Sheets

CALCULATING AN ET VALUE FOR AN IRRIGATION AREA

CROSS-REFERENCES TO RELATED APPLICATIONS

The present application is a continuation-in-part (CIP) of patent application Ser. No. 10/977,349, titled "METHOD AND SYSTEM FOR CONTROLLING AN IRRIGATION USING COMPUTED EVAPOTRANSPIRATION VALUES", filed Oct. 29, 2004 now U.S. Pat. No. 7,337,042; patent application Ser. No. 10/977,130, titled "METHOD AND SYSTEM FOR CONTROLLING AN IRRIGATION SCHEDULING ENGINE USING COMPUTED EVAPOTRANSPIRATION VALUES", filed Oct. 29, 2004; and patent application Ser. No. 10/977,131, titled "METHOD AND SYSTEM FOR PROVIDING OFFSET TO COMPUTED EVAPOTRANSPIRATION VALUES", filed Oct. 29, 2004; which are based on and claim the benefit of (1) U.S. Provisional Patent Application Ser. No. 60/515,932, entitled "METHOD FOR CONTROLLING IRRIGATION USING COMPUTED EVAPOTRANSPIRATION VALUES", filed on Oct. 29, 2003, (2) U.S. Provisional Patent Application Ser. No. 60/515,628, entitled "METHOD FOR CONTROLLING AN IRRIGATION SCHEDULING ENGINE USING COMPUTED EVAPOTRANSPIRATION VALUES", filed on Oct. 29, 2003, and (3) U.S. Provisional Patent Application Ser. No. 60/515,905, entitled "METHOD FOR PROVIDING OFFSET TO COMPUTED EVAPOTRANSPIRATION VALUES", filed on Oct. 29, 2003, the disclosures of which are hereby incorporated by reference in their entirety for all purposes.

FIELD OF THE INVENTION

The present invention generally relates to characterizing weather information. More specifically, the invention relates to calculating an ET value for an irrigation area.

BACKGROUND OF THE INVENTION

Typically, weather data, such as temperature or atmospheric pressure, is measured from a physical weather station or other physical weather parameter measuring device at a particular location. This weather data provided is generally collected, stored and made available to a user. The user upon collecting or receiving the weather data can further analyze, or make additional calculations using this weather data. For example, a user might take one or more weather parameters, such as temperature and calculate Evapotranspiration (ET), or amount of water used by a plant for those measured weather conditions. The user may then manually enter or communicate this value to an irrigation controller which in turn calculates the appropriate amount of irrigation based on the ET and the user input information.

Figure 1:
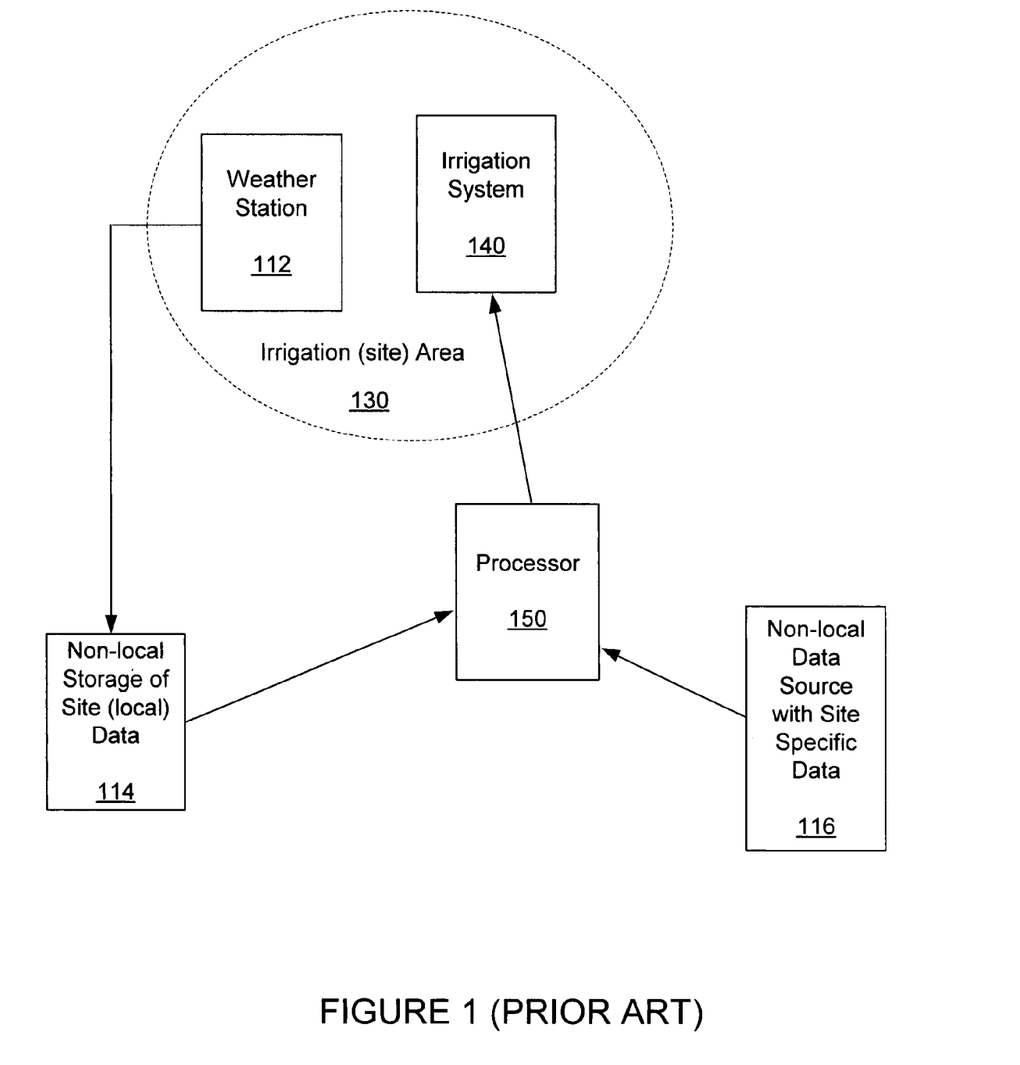
FIG. 1 shows a prior art system for controlling irrigation of an irrigation area.

FIG. 1 shows a prior art irrigation system in which a local weather station 112 located within an irrigation area 130 provides weather information that can be used to control an irrigation system 140 within the irrigation (site) area 130. The weather information can be stored in non-local storage 114, but still represents the weather at the site of the irrigation system. The irrigation system can also receive weather parameters from a non-local data source 116 (such as a satellite), but the data (weather information) of the non-local data source 116 reflects weather of the site (irrigation) area 130. A processor 150 receives the irrigation area weather information and controls the irrigation system 140.

Irrigation systems that include the above-described controller to control the amount of irrigation based on calculated ET can be sub-optimal because the physical weather measuring parameter device may be located somewhere other than where the irrigation area is located. Therefore, the calculated ET may not provide an accurate estimate of the irrigation required because the ET is calculated based on physical weather measurements that do not accurately represent the weather at the irrigation area.

Additionally, ET is generally calculated using grid based processing. With grid based processing, a value for a weather parameter to be used in the calculation of the ET is estimated using an average of the weather parameter within a specified cell of a grid. A disadvantage of grid based processing is that a weather parameter in the grid cell may have large variation within the grid. Typically, the weather parameter is averaged across the cell of the grid. This can result in a loss in accuracy depending on the weather parameter, the adjacent or associated weather parameters, and grid cell size.

It is desirable to accurately calculate an ET value for an irrigation area, when data for calculating the ET in the irrigation area is not available.

SUMMARY OF THE INVENTION

An embodiment of the invention includes a method of calculating an ET value for an irrigation area. The method includes a weather parameter measurement system collecting at least one weather parameter of a weather parameter area, the at least one weather parameter of the weather parameter area providing a representation of weather outside of the irrigation area. An irrigation area weather parameter is calculated providing a representation of weather within the irrigation area from the at least one weather parameter of the weather parameter area. The ET value for the irrigation area is calculated from an N-dimensional continuous function using the at least one irrigation area weather parameter, wherein the N-dimensions includes at least a 3-dimensional spatial cube.

Another embodiment of the invention includes a method of providing a non-measured weather related parameter to an irrigation system. The method includes a weather parameter measurement system collecting at least one weather parameter of a weather parameter area, the at least one weather parameter of the weather parameter area providing a representation of weather outside of the irrigation area. An irrigation area weather parameter is calculated providing a representation of the weather parameter within the irrigation area from the at least one weather parameter outside of the weather parameter area. A non-measured weather parameter is calculated for the irrigation area from an N-dimensional continuous function using the at least one irrigation area weather parameter, wherein the N-dimensions includes at least a 3-dimensional spatial cube. The non-measured weather related parameter is provided to the irrigation system, and the irrigation system controls irrigation of an irrigation area based on the non-measured weather related parameter.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DETAILED DESCRIPTION

ET can be used to determine the amount of water needed to maintain plant health and conserve water of an area to be irrigated. If the weather parameters required to compute the ET are not measured at that location (that is, at the irrigation location), then non-optimal or inappropriate irrigation can occur. ET can be calculating using a wide variety of equations, such as, a Penman-Moneith or a Penman-Montieth derived equation. Many of these equations require multiple weather parameters that are not commonly measured at locations where there are ET calculation requirements. That is, the weather parameters are not typically available, for example, at an irrigation area where an ET value is desired for determining irrigation requirements for the irrigation area.

One embodiment of calculating ET uses a Penman-Monteith or Penman-Montieth derived equation that is generally used for the calculation of daily values, for example:

$$ET_0 = \frac{0.408\Delta(R_n - G) + \gamma \frac{900}{T + 273} u_2(e_s - e_a)}{\Delta + \gamma(1 + 0.34u_2)}$$

where $ET_o$ is reference evapotranspiration [mm day$^{-1}$], $R_n$ is net radiation at the crop surface [MJ m$^{-2}$ day$^{-1}$], G is soil heat flux density [MJ m$^{-2}$ day$^{-1}$], T is mean daily air temperature at 2 m height [° C.], $u_2$ is wind speed at 2 m height [m s$^{-1}$], $e_s$ is saturation vapour pressure [kPa], $e_a$ is actual vapour pressure [kPa], $e_s$-$e_a$ saturation vapour pressure deficit [kPa], $\Delta$ slope vapour pressure curve [kPa ° C.$^{-1}$], γ psychrometric constant [kPa ° C.$^{-1}$].

Evapotranspiration (ET) is defined as the amount of water that evaporates from vegetation (transpiration) and from the underlying soil (evaporation). Evaporation and transpiration occur simultaneously and there is no easy way of distinguishing between the two processes. The combined process, Evapotranspiration (ET) is the numerical value used to control the irrigation within a geographic area. Reference Evapotranspiration is defined as the calculated ET that occurs from a standardized "reference" crop such as clipped grass or alfalfa. The calculation of the Reference ET from the vegetative surfaces, and for standardization purposes, utilizes a short, well-water grass or a taller, well-watered alfalfa crop fort the baseline. The terms suggested for use by the ASCE, for the standardized short reference is ETos, and for the standardized tall reference ETrs. Here, the term ET refers to the calculated Reference Evapotranspiration term ETos.

The ET equation provided as well as many others, require multiple weather parameters that are not commonly measured at locations where the ET calculations are required. If the weather parameters required for calculation of the ET values are not measured at that location, then non-optimal or inappropriate irrigation can occur. Typically, the weather parameter data needed for these calculations comes from weather stations. However, the weather stations are typically extremely sparse, and often are located at large distances away or in places that are not optimal for local use (that is, use where the irrigation area is located). Therefore, accurate calculated weather parameter data for specific areas is very valuable.

Irrigation systems that use weather parameters measured at a location different than the location of the irrigation have other issues as well. For example, the data collected or received does not necessarily accurately reflect the local weather conditions that are applicable to the areas covered by the irrigation system. The weather station may be located in an area where the weather conditions vary significantly from those of the areas covered by the irrigation system. As a result, the weather parameters which are based on data collected from the weather station may cause the irrigation system to provide irrigation that is not appropriate for the local conditions. Systems that rely upon weather data, must either measure all the weather parameters for the location of interest, or only use a limited number of measured weather parameters. Non-optimal irrigation can result by combining the limited number of measured weather parameters with measured weather parameter data from outside the irrigation area.

Figure 2:
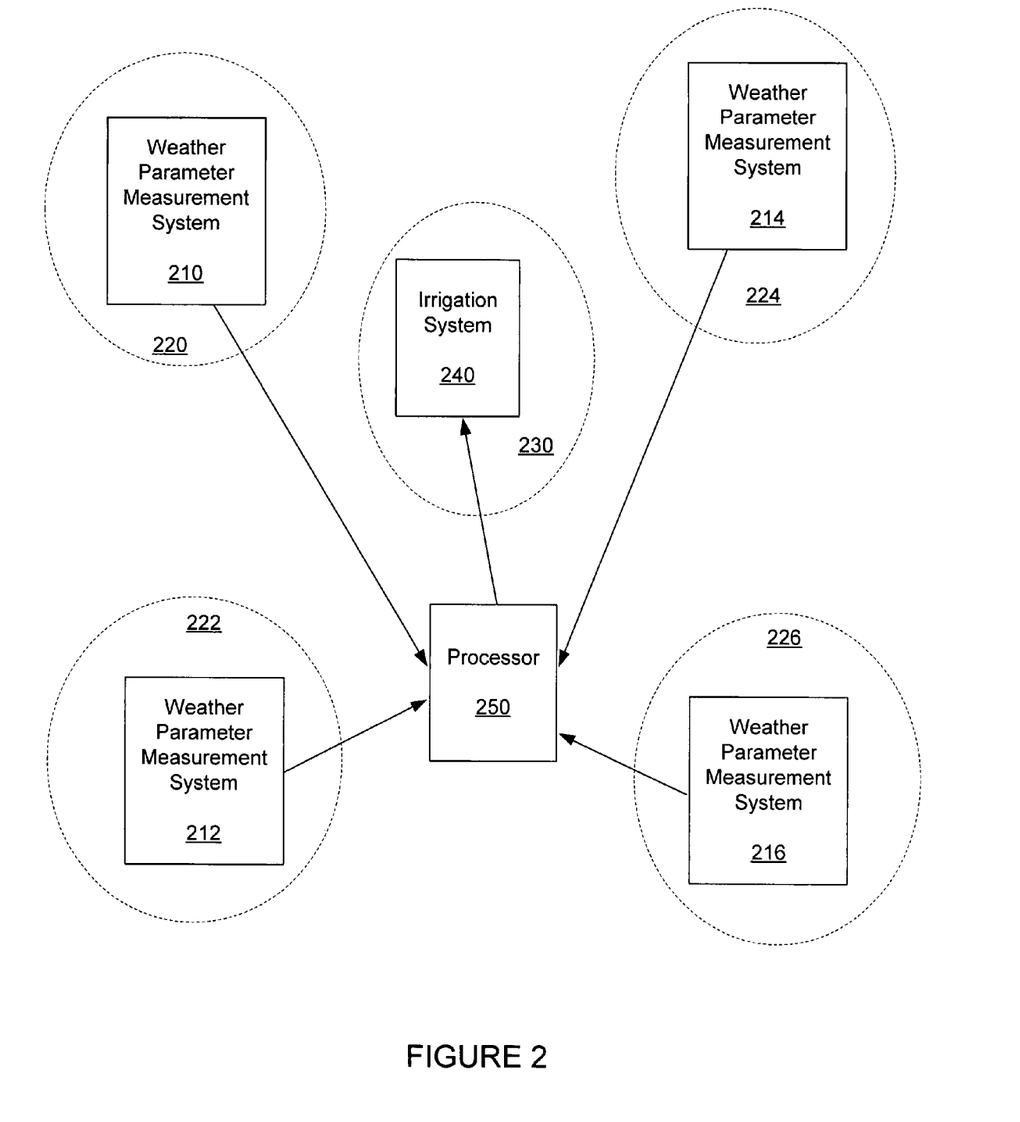
FIG. 2 shows a system for collecting weather parameters of areas outside of the irrigation area that can be used for calculating an ET value for an irrigation area.

FIG. 2 shows one example of a system for measuring weather parameters that can be used for calculating an ET value for an irrigation area. The system includes weather parameter measurement systems 210, 212, 214, 216 for collecting and/or providing weather parameters. For the embodiment of FIG. 2, a first weather parameter measurement system 210 is located in a first area 220, a second weather parameter measurement system 212 is located in a second area 222, a third weather parameter measurement system 214 is located in a third area 224, and a fourth weather parameter measurement system 216 is located in a fourth area 226. As shown in FIG. 2, the weather parameter measurement systems 210, 212, 214, 216 can be located in areas different than an irrigation area 230. The four weather parameter measurement systems 210, 212, 214, 216 shown in FIG. 2 are merely examples. That is, there can be more or less weather parameter measurement systems than shown in FIG. 2. However, none of the weather parameter measurement systems are required to be located within the irrigations area 230, nor do they need to provide measurement data reflecting weather within the irrigation area 230. This is very desirable because weather parameter measurement systems are not always available within irrigation areas. For one embodiment, the weather parameters measurement systems 210, 212, 214, 216 are located in terrestrial areas that are at different locations than the irrigation area 230.

It should also be noted that the weather parameters collected by the weather measurement systems 210, 212, 214, 216 can represent weather for areas that are outside of the irrigation area. The weather parameters representing weather for one or more areas outside the irrigation area can be used to calculate an irrigation area weather parameter. For one embodiment, this calculation can be performed, for example, by executing a numerical weather model in which one or more weather parameters from outside the irrigation area are used as inputs to the numerical weather model. Exemplary numerical weather models (NWM) may include, but are not limited to, a NCAR/Pen State MM5 or a NOAA/NWS WRF. These and other models are well-known. For another embodiment, an irrigation area weather parameter can be calculated by interpolating between weather parameters that each represent weather in areas outside of the irrigation area.

Examples of weather parameter measurement systems include, for example, weather stations. Generally, a weather station is a facility with instruments and equipment to measure, record, and transmit weather observations. This is done by monitoring and measuring atmospheric conditions. Typical weather stations measure temperature, barometric pressure, humidity, wind speed, wind direction, and precipitation. Advanced weather stations also measure both long wave and short wave solar radiation, and may include soil moisture, soil temperature. Another type of weather parameter measurement systems may be a satellite observations system, aircraft, ships, floating buoys, and balloons called radiosondes.

Generally, a weather parameter can be defined as data that describes the state of the atmosphere at a given place and time. A non-exhaustive list of examples of weather parameters includes temperature, barometric pressure, humidity, wind speed, wind direction, precipitation, solar radiation, ground temperature, along with the date time and location that the measurements were taken.

A processor 250 (that can be located anywhere) receives the weather parameters from the weather parameter measurement systems 210, 212, 214, 216 and computes, for example, an ET value at a point or area, which is can be defined by latitude, longitude, elevation or more generally, as x, y, z coordinates of a spatial cube. The ET value at the point or area is calculated from a continuous N-dimensional continuous function. Additional weather factors can also be used in both weather parameter and ET value calculations.

The ET value can be used to control, for example, an irrigation system 240 that in turn controls irrigation of an irrigation area 230. The ET value provides an accurate representation of the weather at a local area, such as, the irrigation area 230.

The ET value is calculated based on a number of parameters including, for example, temperature, wind speed and solar radiation. The number of parameters may change depending on the methodology that is used to calculate the ET value. The weather parameter measurement systems 210, 212, 214, 216 collectively provide information on these parameters. Each weather parameter measurement systems 210, 212, 214, 216 may provide information corresponding to one or more parameters. The information is then used to compute the ET value. Data from weather parameter measurement systems 210, 212, 214, 216 is useful because the area 230 in which the irrigation system 240 is located may not have sufficient measuring apparatus to derive information that is needed to determine the ET value in the irrigation area 230.

Figure 3:
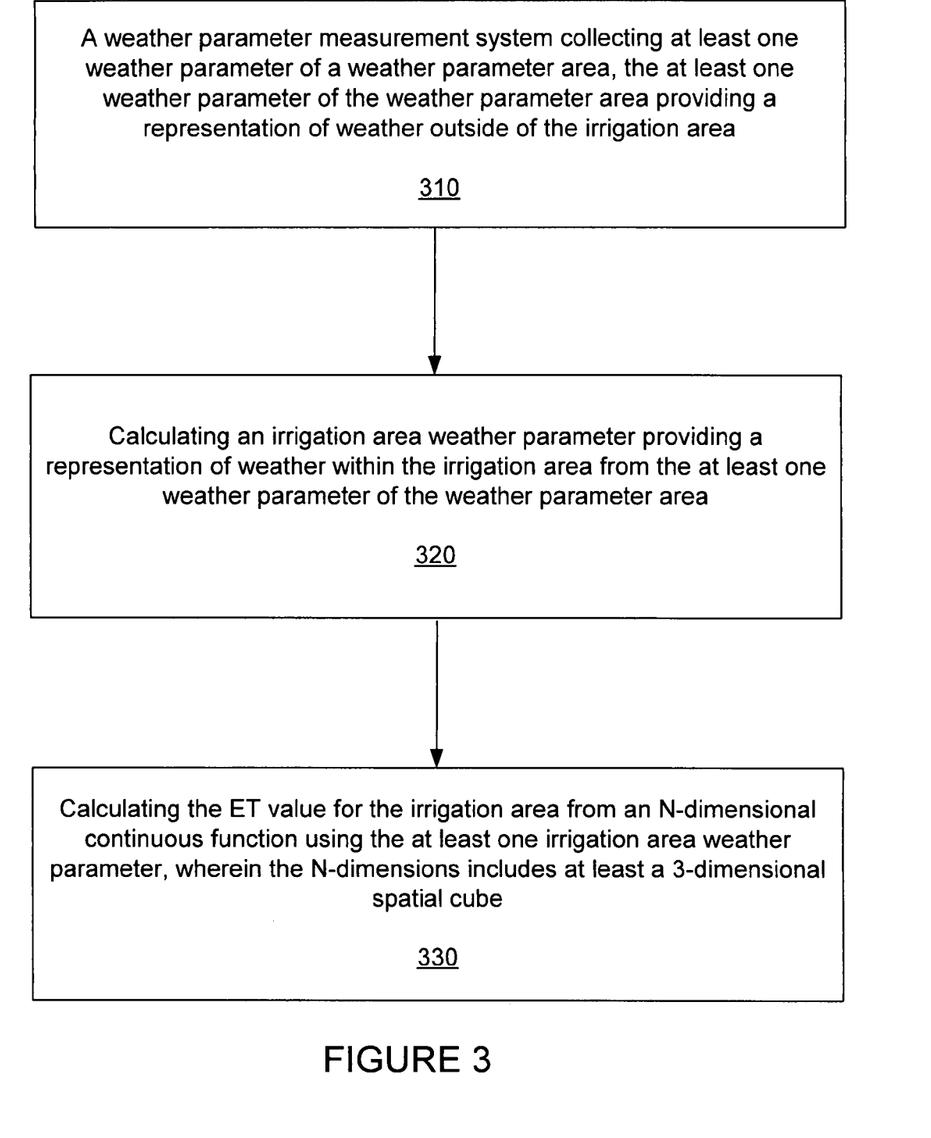
FIG. 3 is a flow chart that includes steps of an example of a method of calculating an ET value for an irrigation area.

FIG. 3 is a flow chart that includes steps of an example of a method of calculating an ET value for an irrigation area. As described above, the ET value can be used to aid in the control of an irrigation system. A first step 310 of the method includes a weather parameter measurement system collecting at least one weather parameter of a weather parameter area, the at least one weather parameter of the weather parameter area providing a representation of weather outside of the irrigation area. A second step 320 of the method includes calculating an irrigation area weather parameter providing a representation of weather within the irrigation area from the at least one weather parameter of the weather parameter area. A third step 330 includes calculating the ET value for the irrigation area from an N-dimensional continuous function using the at least one irrigation area weather parameter, wherein the N-dimensions includes at least a 3-dimensional spatial cube.

Various methods can be used to estimate an irrigation area weather parameter based on weather parameters that represent weather conditions in locations or area outside of the irrigation area. For example, the previously described numerical weather model can be used with the at least one weather parameter of the weather parameter area.

In addition to the weather parameter measurement system described above, another embodiment additionally includes a second weather parameter measurement system collecting at least one second weather parameter of a second weather parameter area, wherein the at least one second weather parameter of the second weather parameter area provides a representation of weather outside of the irrigation area. An irrigation area weather parameter is calculated using the initial weather parameter and the at least one second weather parameter outside of the weather parameter area.

One embodiment includes the irrigation area weather parameter being calculated by an interpolation between the at least one weather parameter and the at least one second weather parameter. This allows for the calculation of the irrigation area weather parameter when, for example, no measured data for the irrigation area is available.

Another embodiment includes the irrigation area weather parameter being determined using a numerical weather model. The one weather parameter and the second weather parameter that represent weather for areas outside of the irrigation area are input to a numerical weather model, providing the irrigation area weather parameter. As previously described, exemplary numerical weather models (NWM) may include, but are not limited to, a NCAR/Pen State MM5 or a NOAA/NWS WRF. The model type can vary depending upon the particular irrigation area and conditions.

As described and shown in FIG. 3, the ET value is calculated from an N-dimensional continuous function using the at least one irrigation area weather parameter. An N-dimensional continuous function is any continuous function that is fully described with N variables. The term continuous means that for small change in the input variables there exists a small change in the function result. For one example, wind speed can be calculated at a non-local point by converting the wind speed into U, V and W components, where U, V and W are zonal, meridional and vertical components. The zonal component is an east-west component, the meridional component is a north-south component, and the vertical component is an up-down component. Provided there are more than two known measured or modeled points, a continuous surface can be created for each of the U, V and W components using a thin plate spline, or by using a modified numerical weather model that provides continuous surfaces. The speed can then be calculated at any point on this continuous surface with the equation:

$$\text{Speed} = \text{square root}(U*U + V*V + W*W),$$

where the U, V and W values are extracted via a function from the continuous surfaces at a location x, y, z and time.

This method provides calculated weather parameters from measured weather parameters by using the weather conditions of area(s) outside of the irrigation area, which in this exemplary case is wind speed. Similar equations and function can be used to determine all of the weather parameter data needed to calculate ET.

One exemplary method of calculating a weather parameter, such as temperature, includes determining domain boundaries, such as the United States. First, a set of measured temperatures from weather stations through out the domain area are obtained. Next, these temperatures are converted to sea level temperatures for each location based on a simple lapse rate calculation such as: Sea Level Temperature in C.=Temperature in C. at height Z in meters—(Z*(6.5/1000.0)), where the lapse rate is assumed to be 6.5 degrees C. per 1000 meters. Another exemplary method of calculating the lapse rate includes using the N-dimensional function and allowing the lapse rate to vary in both time and space instead of the fixing the lapse rate as described above. This method provides a more accurate representation of the lapse rate weather conditions across a large geographical area.

Once all the individual point temperatures values are on the same elevation plane, in this case sea level, a grid of the temperatures across the domain are determined using an application such as a thin plate spline. This creates a surface of points that is continuous in nature of non-measured sea surface temperatures. This is significantly different then the type of grid that is used in numerical weather models (NWM). A NWM grid cell represents the average of the value of all the values within the bounds of the cell. Whereas a thin plate spline creates a surface that passes each of the z value at all x, y locations. In this case the z value is the sea level temperature. A cubic convolution of this surface and the nearest 16 control points in x, y space can be used to provide the sea level temperature at any x, y location within the surface. To expand the function to include time dimension in the example describe, at least two sea level surfaces of temperature are required at times T1 and T2. The function is then expanded to use the new dimension of time. To return the temperature on the surface of the ground, the elevation term, and the original lapse rate function is used to create a similar temperature surface for each time T1 and T2. This type of calculation using weather factors and one or more N-dimensional functions similar to those used to calculate temperature can be used for other weather parameters such as wind speed, humidity, and solar radiation.

One embodiment includes a method of calculating an ET value using the N-dimensional function, and at least one collected weather parameter that represents weather outside of the irrigation area. This is important and non-obvious because it can provide one or more weather parameters for a location that does not have a measured weather parameter for the irrigation area. Calculating the ET value is important, for example, in calculating ET, or calculating an amount of water used by a plant for given weather conditions. The calculation of the ET value is also useful because it provides information to an irrigation control system, enabling maximization of water conservation by only irrigating with the amount of water needed. However, since most irrigation control systems do not also have a local weather station which provides all the required weather parameters to calculate ET, there is a need to provide non-measured weather parameters that are local to the irrigation control system.

The usefulness of providing local non-measured weather parameters can be extended to other areas and applications. For example, other exemplary areas and applications include, but are not limited to, weather damage assessments for insurance purposes, utility energy management and budgets, highway and railroads to mitigate weather related issues, and farm or agriculture application Traditionally, to calculate ET values, and non-measured weather parameters, practitioners use grid based processing. This process generates non-measured weather parameters that are fit into a matrix of cells with discrete values in each cell. This is not, and does not provide a continuous function of weather parameters. The quality of the value in each cell is dependant on the quality of the calculations to determine the non-measured weather parameter and the grid cell size (resolution). The calculations of weather parameters described differ from grid based processing by using an N-dimensional continuous function to calculate weather parameters. This provides a resolution independent method to calculate weather parameters and ET values, which can be much more computationally efficient and accurate. Grid based processing is also lacking because the weather parameter in a grid cell is only the average value weather parameter over a relatively large geographic area. The weather parameter may actually have large a variation that is muted by this average. This is particularly problematic in areas that include mountains or valley areas, or in regions in close proximity of large bodies of water or rivers.

Calculating ET values and non-measured weather parameter based on an N-dimensional function, allows determination of the desired parameter(s) for any point in space or time. The function is determined by knowing the desired weather parameter, and the specific physics based equations that will provide desired weather parameter and the weather factors that are required by the function to provide the desired weather parameter.

Figure 4A:
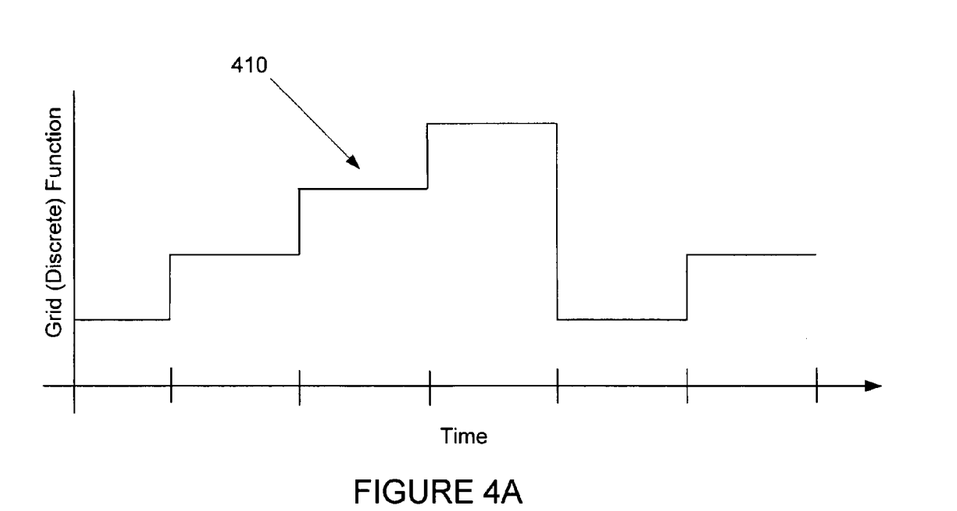
FIGS. 4A and 4B show comparisons between a grid and a continuous function.
Figure 4B:
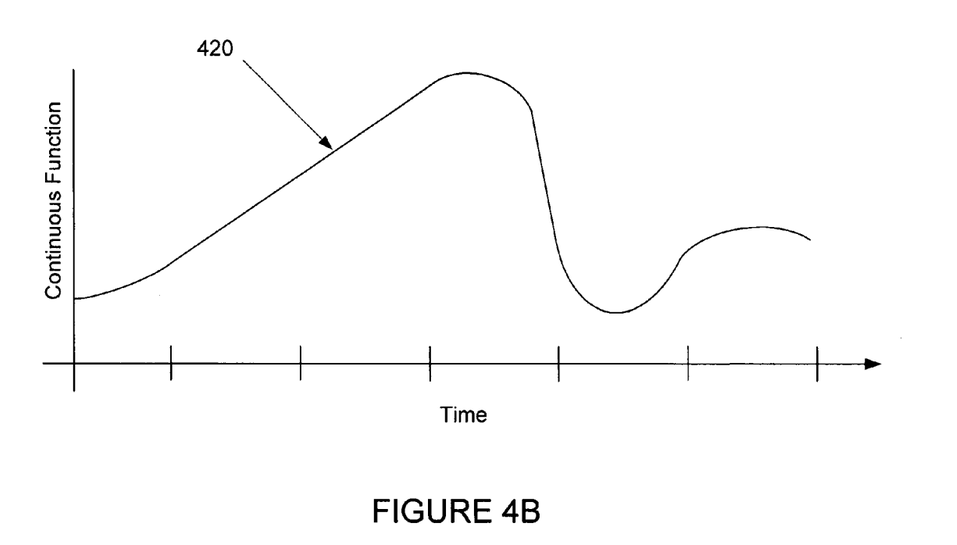

FIGS. 4A and 4B show an exemplary grid function 410 and an exemplary continuous function 420. The grid function 410 includes discontinuous points whereas the continuous function 420 does not include these discontinuities. The continuous function of FIG. 4B is of only one dimension rather than the greater than three dimensions of the N-dimension continuous function of the ET value calculations. A continuous function provides a value for a given set of input parameters. For example, for every input time t, a continuous function provides a temperature T at location x, y, z that may vary assuming the temperature was collected continuously. However, if the temperature T at location x, y, z is only collected every hour, then the temperature for any time within that hour is the same temperature, and the function is discontinuous.

As previously stated, the ET value can be calculated from an N-dimensional continuous function using the at least one irrigation area weather parameter, wherein the N-dimensions includes at least a 3-dimensional cube and wherein N is greater than 3. For an embodiment, the N-dimensions of the continuous function includes, for example, at least latitude, longitude, elevation.

For one embodiment calculating the ET value for the irrigation area includes calculating irrigation area weather parameters for the irrigation area for a desired time using the N-dimensional continuous function which includes at least one collected or calculated weather parameter for locations outside of the irrigation area. Another embodiment additionally includes at least one weather factor. The weather factor can be, for example, topography, slope, aspect, soil conditions, vegetation indexes, and land use types.

The temperature parameter component of an N-dimensional function can be adaptively updated depending on a comparison of non-measure weather parameters and measured weather parameters from a data source (such as, a weather station). For example, a non-measured weather parameter, such as, temperature can be compared with a measured temperature at x, y and z locations where measured temperatures are available. A lapse rate function can then be adaptively updated accordingly to provide a better calculated temperature at any/all locations. In turn, ET values are updated wherever temperature values are updated. The methods of adaptively updating can be used for most of the calculated weather parameters.

An ET component N-dimensional function can be updated, for example, based on an impact of the ET value. More specifically, the ET value can be used to control irrigation of an irrigation area. The impact can be gauged by determining an adequacy of an irrigation system that is at least partially controlled by this ET value. This can be determined by measuring how adequate the application of water in the irrigation area is by observing the total health of plants within the irrigation area, or by monitoring soil moisture probes that provide a measurement of the soil moisture.

Another embodiment includes selecting the frequency at which the ET value is calculated. For one embodiment, the ET value is calculated at a rate that is greater than a Nyquist frequency of a dominant harmonic of the natural cycle of the ET value. That is, generally, the ET value has a natural cycle over a period of time. The cycle can be, for example, defined by a daily minimum and maximum value. Once the frequency of the natural cycle has been determined, the frequency at which the ET value should be calculated can be determined. Other factors that may affect this natural cycle may be static in nature, or dynamically changing. A static example is the high desert where the natural daily temperature cycle is significantly different than the natural cycle in the great plains regions. A dynamic changing example is a warm or cold slow moving air mass. Both of these examples, along with others, affect the natural ET cycle.

Depending upon the natural cycle of the ET value, the ET value can be conveniently calculated at a rate adequate to define the natural cycle. The rate used is selected at a value greater than the Nyquist frequency. The rate can be selected as daily, hourly or by the minute depending on the conditions and the needs of the ET value application.

Figure 5:
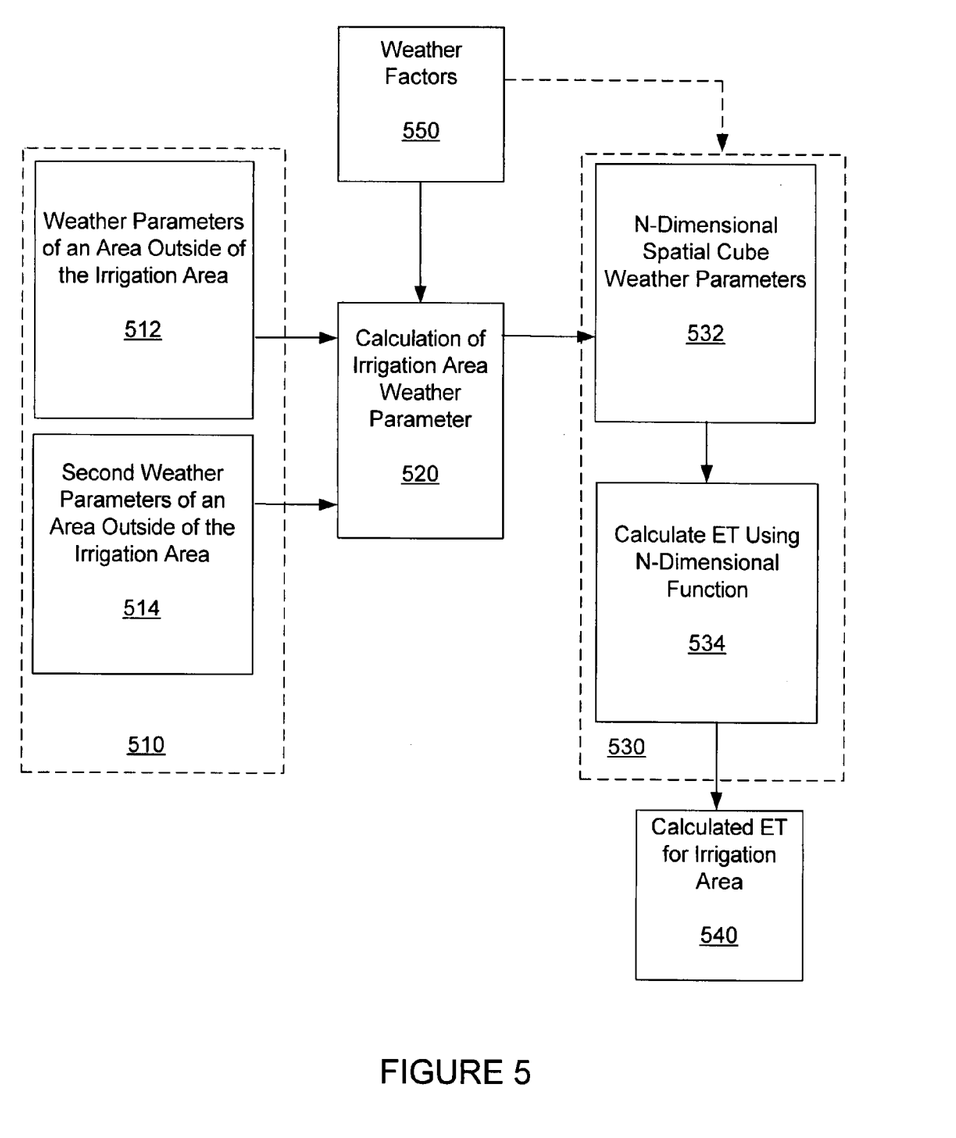
FIG. 5 is a block diagram of an example of a system that implement the method of FIG. 3.

FIG. 5 is a block diagram of an example of a system that implements the method of FIG. 3. One or more weather parameter measurement systems can measure or collect weather parameters that represent weather conditions within areas or at locations outside of the irrigation area, as depicted by blocks 512, 514. Here, the first step 310 of FIG. 3 is completed, and depicted by the block 510.

The weather parameters that represent weather conditions within areas or at locations outside of the irrigation area can be used to calculate or estimate one or more irrigation area weather parameter(s), as depicted by block 520. Here, the second step 320 of FIG. 3 is completed, and depicted by the block 520. Weather factors can additionally be used to calculate the irrigation area weather parameter. As previously described, the irrigation area weather parameters can be calculated using a numerical weather model in which the non-irrigation area weather parameters are input to the model. Also as described, the irrigation area weather parameters can be calculated by interpolating between non-irrigation area weather parameters.

Next, the third step 330 of FIG. 3 is depicted by the block 530. The one or more calculated irrigation area weather parameters are used to calculate an ET value for the irrigation area.

As shown by the block 532, the irrigation are weather parameters can be for x, y and z locations. Additionally, the irrigation area weather parameters can be for various times t. Varying the weather calculations with time can be desirable due to the fact that the weather generally changes with time. For example, temperature, is generally cooler at night, warms slightly in the morning, more by the middle of the day, and starts to cool off again in the evening. The rate and timing of these changes is critical to the accuracy of the ET calculations in the irrigation area.

The block 534 shows the calculation of an ET value using an N-dimensional function, in which the spatial cube weather parameters of block 532 are the inputs to the N-dimensional function.

As depicted by block 540, the calculated ET value is used to control irrigation of the irrigation area.

A fundamental purpose for collecting non-local weather factors is to allow for an accurate calculation of the weather parameters inside of the irrigation area. This in turn provides a more optimal usage of water in the irrigation area. An example of a non-local weather factor is topography. For example, if the irrigation area is in the flat part of a wide valley, and to the west of the irrigation area is a mountain ridge that is significantly higher in elevation, then surrounding irrigation area topography information can be used to improve calculation of weather parameters inside the irrigation area. Also, for example, if there is a downslope wind out of the west, and off of the mountains, a significant temperature increase in the irrigation area can result from a non-local weather factor.

Figure 6:
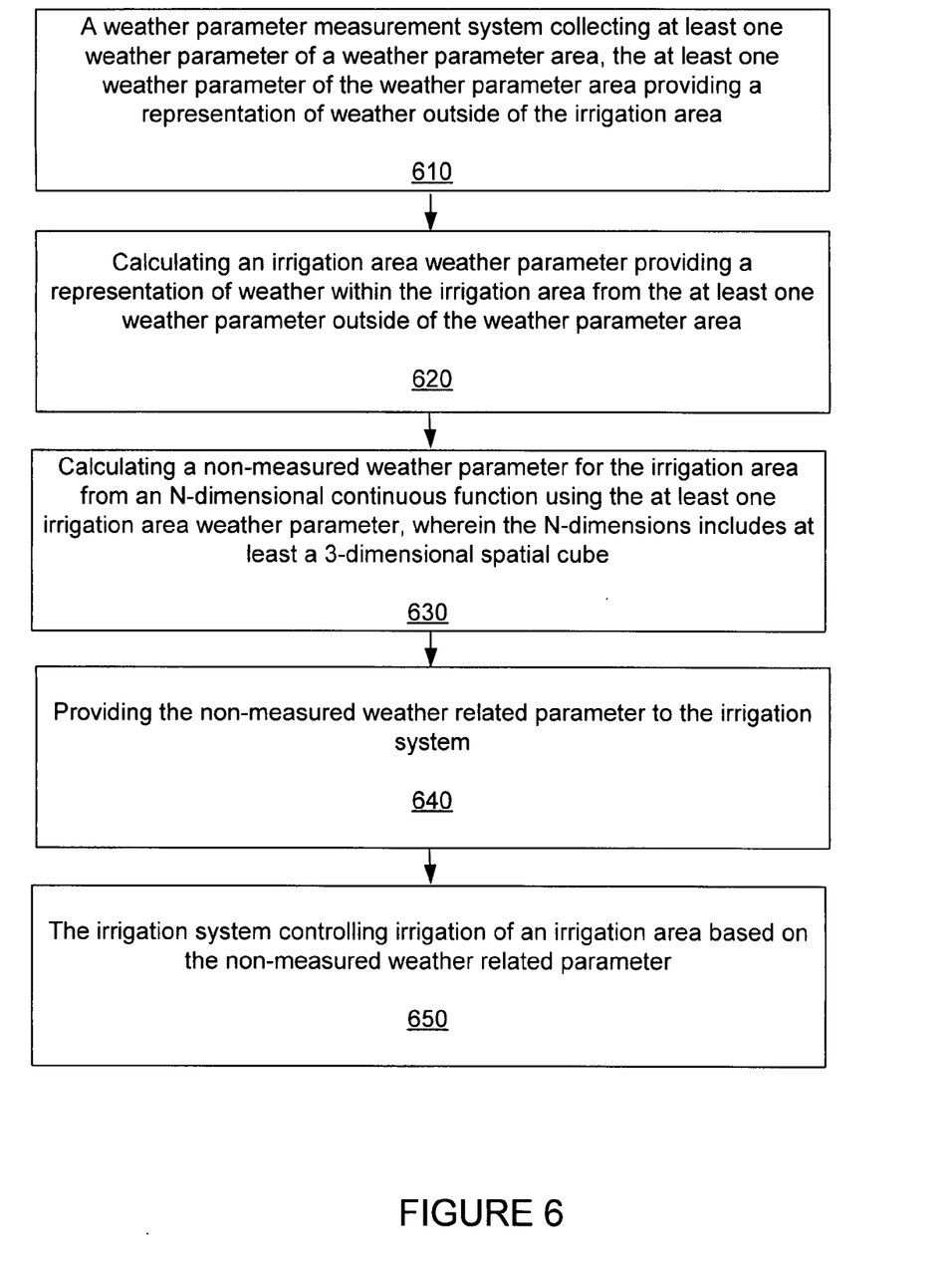
FIG. 6 is a flow chart that includes steps of an example of a method of providing a non-measured weather related parameter to an irrigation system.

FIG. 6 is a flow chart that includes steps of an example of a method of providing a non-measured weather related parameter to an irrigation system. A first step 610 of the method includes a weather parameter measurement system collecting at least one weather parameter of a weather parameter area, the at least one weather parameter of the weather parameter area providing a representation of weather outside of the irrigation area. A second step 620 includes calculating an irrigation area weather parameter providing a representation of the weather within the irrigation area from the at least one weather parameter outside of the weather parameter area. A third step 630 includes calculating a non-measured weather parameter for the irrigation area from an N-dimensional continuous function using the at least one irrigation area weather parameter, wherein the N-dimensions includes at least a 3-dimensional spatial cube. A fourth step 640 includes providing the non-measured weather related parameter to the irrigation system. A fifth step 650 includes the irrigation system controlling irrigation of an irrigation area based on the non-measured weather related parameter.

An embodiment of the N-dimensions of the continuous function includes at least latitude, longitude, and elevation dimensions, as previously referred to as x, y, z. Another embodiment additionally includes a time dimension, previously referred to as t.

For another embodiment, calculating the weather related parameter for the irrigation area includes calculating irrigation area weather parameters for the irrigation area for a desired time using the N-dimensional continuous function which includes at least one collected or calculated weather parameter for locations outside of the irrigation area.

For another embodiment, the N-dimensional function is adaptively updated based on a quality of the non-measured weather parameter.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed:

1. A method of calculating an ET value for an irrigation area, comprising:
a weather parameter measurement system collecting at least one weather parameter of a weather parameter area, the at least one weather parameter of the weather parameter area providing a representation of weather outside of the irrigation area;
calculating an irrigation area weather parameter providing a representation of weather within the irrigation area from the at least one weather parameter of the weather parameter area;
calculating the ET value for the irrigation area from an N-dimensional continuous function using the at least one irrigation area weather parameter, wherein the N-dimensional continuous function includes at least a 3-dimensional spatial cube.

2. The method of claim 1, further comprising:
a second weather parameter measurement system collecting at least one second weather parameter of a second weather parameter area, the at least one second weather parameter of the second weather parameter area providing a representation of weather outside of the irrigation area; and wherein
calculating the irrigation area weather parameter providing a representation of the irrigation area weather parameter within the irrigation area, further includes the at least one second weather parameter of the second weather parameter area.

3. The method of claim 2, wherein calculating the irrigation area weather parameter providing a representation of the irrigation area weather parameter within the irrigation area further includes the at least one second weather parameter of the second weather parameter area comprises interpolating between the at least one weather parameter and the at least one second weather parameter.

4. The method of claim 2, wherein calculating the irrigation area weather parameter providing a representation of the irrigation area weather parameter within the irrigation area further comprises executing a numerical weather model with the at least one weather parameter and the at least one second weather parameter as inputs to the numerical weather model.

5. The method of claim 1, wherein the N-dimensions of the continuous function comprises at least latitude, longitude, and elevation dimensions.

6. The method of claim 5, wherein the N-dimensional continuous function further comprises a time dimension.

7. The method of claim 1, wherein calculating the ET value for the irrigation area comprises calculating irrigation area weather parameters for the irrigation area for a desired time using the N-dimensional continuous function which includes at least one collected or calculated weather parameter for locations outside of the irrigation area.

8. The method of claim 1, wherein calculating the ET value for the irrigation area comprises calculating irrigation area weather parameters for the irrigation area for a desired time using the N-dimensional continuous function which includes at least one collected or calculated weather parameter for locations outside of the irrigation area and at least one weather factor.

9. The method of claim 1, further comprising:
adaptively updating the N-dimensional function based on a quality of the ET value.

10. The method of claim 1, further comprising:
adaptively updating the N-dimensional function based on a quality of the at least one irrigation area weather parameter.

11. The method of claim 1, further comprising:
adaptively updating the N-dimensional function based on a quality of the at least one weather parameter of the weather parameter area.

12. The method of claim 1, further comprising:
calculating the ET value at a rate that is greater than a Nyquist frequency of a dominant harmonic of a natural cycle of the ET value.

13. The method of claim 12, wherein the ET value is calculated at a rate of once per hour, if the rate of once per hour is greater than the Nyquist frequency.

14. The method of claim 1, further comprising providing the ET value for the irrigation area.

15. A method of providing a non-measured weather related parameter to an irrigation system, comprising:
a weather parameter measurement system collecting at least one weather parameter of a weather parameter area, the at least one weather parameter of the weather parameter area providing a representation of weather outside of the irrigation area;
calculating an irrigation area weather parameter providing a representation of the weather parameter within the irrigation area from the at least one weather parameter outside of the weather parameter area;
calculating a non-measured weather parameter for the irrigation area from an N-dimensional continuous function using the at least one irrigation area weather parameter, wherein the N-dimensions includes at least a 3-dimensional spatial cube,
providing the non-measured weather related parameter to the irrigation system;
the irrigation system controlling irrigation of an irrigation area based on the non-measured weather related parameter.

16. The method of claim 15, wherein the N-dimensions of the continuous function comprises at least latitude, longitude, and elevation dimensions.

17. The method of claim 16, wherein the N-dimensional continuous function further comprises a time dimension.

18. The method of claim 16, wherein calculating the weather related parameter for the irrigation area comprises calculating irrigation area weather parameters for the irrigation area for a desired time using the N-dimensional continuous function which includes at least one collected or calculated weather parameter for locations outside of the irrigation area.

19. The method of claim 15, further comprising:
adaptively updating the N-dimensional function based on a quality of the non-measured weather parameter.

20. An irrigation control system comprising:
a weather parameter measurement system collecting at least one weather parameter of a weather parameter area, the at least one weather parameter of the weather parameter area providing a representation of weather outside of the irrigation area;
a processor calculating an irrigation area weather parameter providing a representation of weather within the irrigation area from the at least one weather parameter of the weather parameter area;
the processor calculating the ET value for the irrigation area from an N-dimensional continuous function using the at least one irrigation area weather parameter, wherein the N-dimensional continuous function includes at least a 3-dimensional spatial cube, providing the ET value for the irrigation area.

21. A method of calculating an ET value for an irrigation area, comprising:

a weather parameter measurement system collecting at least one weather parameter of a weather parameter area, the at least one weather parameter of the weather parameter area providing a representation of weather outside of the irrigation area;

calculating an irrigation area weather parameter providing a representation of weather within the irrigation area from the at least one weather parameter of the weather parameter area;

calculating the ET value for the irrigation area from an N-dimensional continuous function using the at least one irrigation area weather parameter, wherein the N-dimensional continuous function includes at least 3 dimensions.

* * * * *